US012571343B2

(12) United States Patent
Pan et al.

(10) Patent No.: US 12,571,343 B2
(45) Date of Patent: Mar. 10, 2026

(54) POWER GENERATION SYSTEM AND METHOD BASED ON COMPRESSED AIR ENERGY STORAGE TECHNOLOGY THROUGH SOLAR AUXILIARY HOT HUMID AIR

(71) Applicant: DATANG NORTHEAST ELECTRIC POWER TEST & RESEARCH INSTITUTE CO., LTD., Jilin (CN)

(72) Inventors: Tongyang Pan, Changchun (CN); Gang Liu, Changchun (CN); Yu Qiao, Changchun (CN); Zhenchun Fu, Changchun (CN); Jifan Zhang, Changchun (CN); Qingyuan Xue, Changchun (CN); Xifeng Liu, Changchun (CN); Hao Wang, Changchun (CN)

(73) Assignee: DATANG NORTHEAST ELECTRIC POWER TEST & RESEARCH INSTITUTE CO., LTD., Changchun (CN)

( * ) Notice: Subject to any disclaimer, the term of this patent is extended or adjusted under 35 U.S.C. 154(b) by 0 days.

(21) Appl. No.: 19/036,973

(22) Filed: Jan. 24, 2025

(65) Prior Publication Data

US 2025/0237166 A1      Jul. 24, 2025

(30) Foreign Application Priority Data

Jan. 24, 2024      (CN) ......................... 202410094531.5

(51) Int. Cl.
*F02C 1/05*          (2006.01)
*F02C 6/16*          (2006.01)
(52) U.S. Cl.
CPC . *F02C 1/05* (2013.01); *F02C 6/16* (2013.01)

(58) Field of Classification Search
CPC .... F02C 1/05; F02C 6/16; F24S 20/20; F01D 15/10; F03G 6/04; F03G 6/06; F03G 6/111; F04B 35/04; F04B 37/12; F04B 41/02
See application file for complete search history.

(56) References Cited

U.S. PATENT DOCUMENTS 7,856,843 B2 * 12/2010 Enis ........................ F25B 27/00
                                                            62/235.1
9,523,285 B2 * 12/2016 Heiligenstein .......... F28D 20/00
(Continued)

FOREIGN PATENT DOCUMENTS

CN          106499599 A      3/2017
CN          206545528 U      10/2017
(Continued)

OTHER PUBLICATIONS

First Office Action in Chinese Application No. 202410094531.5 mailed on Feb. 29, 2024, 16 pages.
(Continued)

*Primary Examiner* — Jesse S Bogue
(74) *Attorney, Agent, or Firm* — PORUS IP LLC

(57)          ABSTRACT

Provided is a power generation system and method based on compressed air energy storage technology through solar auxiliary hot humid air. The system comprises an energy storage subsystem, a solar heat storage subsystem, and a turbine generator subsystem which are connected in sequence. The energy storage subsystem includes a motor, a compressor, and an air storage tank which are connected in sequence. The solar heat storage subsystem includes a solar heat collector and a solar heat exchanger. The solar heat collector and the solar heat exchanger are connected through a heat transfer oil circulation loop. The system compresses and stores compressed air using the electricity of the power grid when an electrical load is within a low valley, releases (Continued)

the compressed air when the electrical load is within a peak, and heats and humidifies the air before entering the turbine using the recovered compression heat and solar energy.

7 Claims, 1 Drawing Sheet

(56)                    References Cited

U.S. PATENT DOCUMENTS

| | | | | |
|---|---|---|---|---|
| 11,352,950 | B2 * | 6/2022 | Houssainy | ............. F01K 23/06 |
| 2021/0207500 | A1 * | 7/2021 | Klingels | ................ F02C 3/305 |

FOREIGN PATENT DOCUMENTS

| | | | | | |
|---|---|---|---|---|---|
| CN | 207513691 | U | | 6/2018 | |
| CN | 110259654 | A | * | 9/2019 | ............... F02C 6/00 |
| CN | 111075671 | A | | 4/2020 | |
| CN | 114151297 | A | * | 3/2022 | ............ F01D 15/10 |
| CN | 217602730 | U | * | 10/2022 | |
| CN | 115773215 | A | | 3/2023 | |
| CN | 218894745 | U | | 4/2023 | |

OTHER PUBLICATIONS

Notification to Grant Patent Right for Invention in Chinese Application No. 202410094531.5 mailed on Mar. 28, 2024, 5 pages.

* cited by examiner

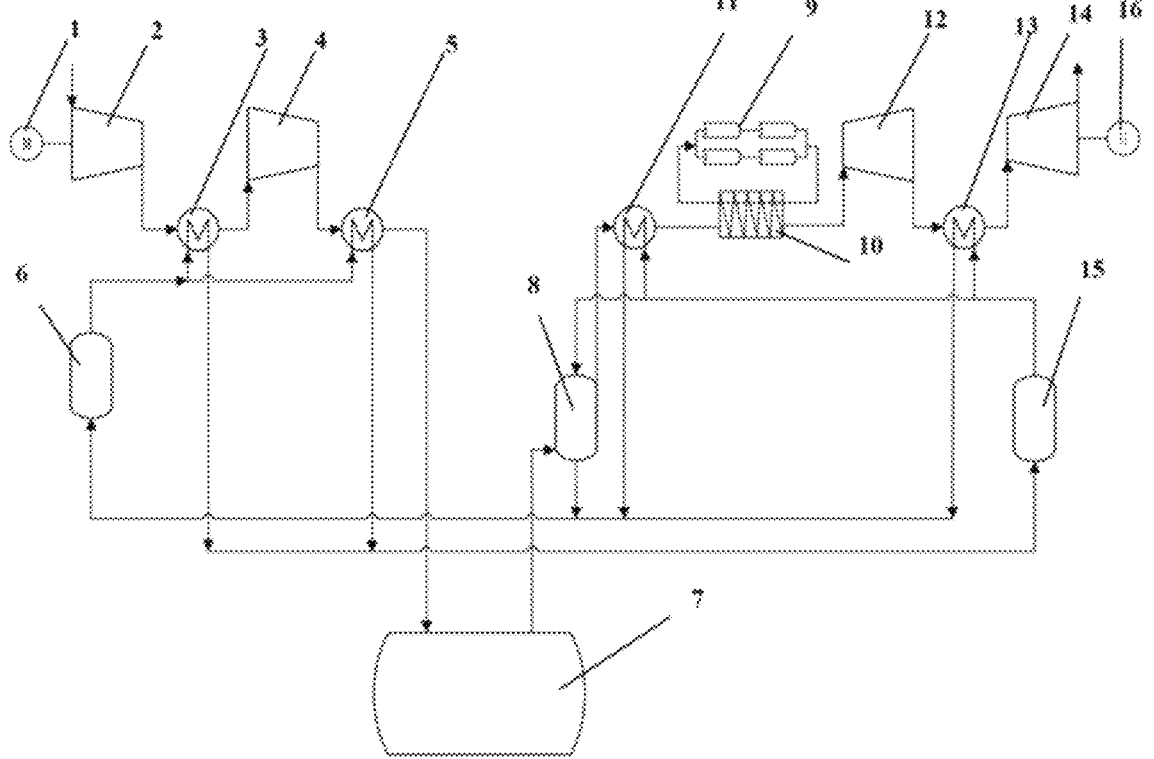

POWER GENERATION SYSTEM AND METHOD BASED ON COMPRESSED AIR ENERGY STORAGE TECHNOLOGY THROUGH SOLAR AUXILIARY HOT HUMID AIR

CROSS-REFERENCE TO RELATED APPLICATIONS

This application claims priority to Chinese Patent Application No. 202410094531.5, field on Jan. 24, 2024, the entire contents of which are incorporated herein by reference.

TECHNICAL FIELD

The present disclosure relates to the technical field of energy storage and power generation.

BACKGROUND

With the rapid development of renewable energy, the proportion of renewable energy is increasing, but renewable energy has a serious disadvantage, namely, unpredictability. Power storage technology is an effective way to solve the above problem.

Compressed air energy storage technology is a large-scale energy storage technology with the advantages of no pollution, large energy storage capacity and long service life. However, the traditional compressed air energy storage system relies on fossil energy and does not utilize the compression heat generated by compression processes. Accordingly, the traditional compressed air energy storage system efficiency is low and has a certain amount of environmental pollution. Therefore, making full use of the compression heat and external solar energy can effectively improve the system efficiency and work capacity.

CN206545528U proposes a non-throttling humidification and enthalpy enhancing compressed air energy storage system and a control method thereof characterized in that the air is humidified using flash evaporation technology. However, the system does not solve the problem of final liquefaction of the turbine, which has certain impacts on the safe operation of the system.

Therefore, how to provide a power generation system and method that effectively improve the system efficiency and have high safety has become an urgent problem in the art.

SUMMARY

In order to solve the above technical problem, the present disclosure provides a power generation system method based on a compressed air energy storage technology through solar auxiliary hot humid air. The system compresses and stores compressed air using the electricity of the power grid when an electrical load is within a low valley, releases the compressed air when the electrical load is within a peak, and heats and humidifies the air before entering the turbine using the recovered compression heat and solar energy. The system has the characteristics of high system efficiency, large work capacity, environmental friendliness, flexible operation mode, and low requirements for project site conditions.

The present disclosure has two independent technical solutions based on the same inventive concept.

1. A power generation system based on compressed air energy storage technology through solar auxiliary hot humid air. The power generation system may comprise an energy storage subsystem, a solar heat storage subsystem, and a turbine generator subsystem which are connected in sequence. The energy storage subsystem may include a motor, a compressor, and an air storage tank which are connected in sequence. The solar heat storage subsystem may include a solar heat collector and a solar heat exchanger. The solar heat collector and the solar heat exchanger may be connected through a heat transfer oil circulation loop.

The power generation system may further comprise a water heat storage subsystem. The water heat storage subsystem may include a cold water tank and a hot water tank. A water circulation loop may be formed between the cold water tank and the hot water tank through a saturator and a plurality of heat exchangers. The plurality of heat exchangers may include a compression heat exchanger connected with an outlet of the compressor, a turbine heat exchanger connected with the turbine generator subsystem, and a saturator heat exchanger connected with an air outlet of the saturator. An air inlet of the saturator may be connected with an outlet of the air storage tank. An air outlet of the saturator heat exchanger may be connected with an air inlet of the solar heat exchanger.

In some embodiments, an outlet of the solar heat collector may be connected with a heat transfer oil inlet of the solar heat exchanger, and a heat transfer oil outlet of the solar heat exchanger may be connected with an inlet of the solar heat collector.

In some embodiments, an outlet of the hot water tank may be divided into three branches. Two of the three branches may be connected with a water inlet of the saturator heat exchanger and a water inlet of the turbine heat exchanger, respectively, and the other of the three branches may be connected with a water inlet of the saturator. A water outlet of the saturator heat exchanger, a water outlet of the turbine heat exchanger, and a water outlet of the saturator may be jointed to be connected with an inlet of the cold water tank.

In some embodiments, the energy storage subsystem may include a first compressor and a second compressor. The compression heat exchanger may include a first compression heat exchanger and a second compression heat exchanger. The first compressor, the first compression heat exchanger, the second compressor, and the second compression heat exchanger may be connected in sequence. An air outlet of the second compression heat exchanger may be connected with an inlet of the air storage tank.

In some embodiments, the turbine generator subsystem may include a first turbine, a second turbine, and a generator. The first turbine, the turbine heat exchanger, the second turbine, and the generator may be connected in sequence. The first turbine may be connected with an air outlet of the solar heat exchanger. An air outlet of the first turbine and an air outlet the second turbine may be connected to atmosphere.

In some embodiments, the motor may be connected with the first compressor through a compression transmission shaft.

In some embodiments, the second turbine may be connected with the generator through a turbine transmission shaft.

In some embodiments, a pressure ratio of the compressor may be 8, an exhaust flow rate of the compressor may be 108 kg/s, an efficiency of the compressor may be 88%, and a rotation speed of the compressor may be 5094 rpm.

In some embodiments, a volume of the air storage tank may be 310000 m$^3$, a surface area of the air storage tank may be 5000 m², a maximum storage pressure of the air storage tank may be 7200 kPa, and a minimum discharge pressure of the air storage tank may be 4200 kPa.

In some embodiments, an air temperature at the air outlet of the saturator may be 422 K, and an air pressure at the air outlet of the saturator may be 3953 kPa.

2. A power generation method based on compressed air energy storage technology through solar auxiliary hot humid air, comprising:

In response that an electrical load is within a low valley, driving the motor using grid electric energy, wherein the motor may drive the compressor to compress air to a high pressure state, and the air may be stored in the air storage tank after being heat exchanged through the compression heat exchanger;

In response that the electrical load is within a peak, releasing high pressure air using the air storage tank, wherein the high pressure air may be heated and humidified by the saturator, then heated by the saturator heat exchanger and the solar heat exchanger, and finally enters into the turbine generator subsystem to work for power generation.

The power generation system and method based on the compressed air energy storage technology through solar auxiliary hot humid air at least comprises the following beneficial effects.

(1) The power generation system provided by the present disclosure compresses and stores compressed air using the electricity of the power grid when the electrical load is within the low valley, releases the compressed air when the electrical load is within the peak, and heats and humidifies the air before the air enters the turbine using the recovered compression heat and solar energy to drive the turbine generator subsystem to work for power generation. The heat of system heat shrinkage is fully absorbed, the mass flow of the working fluid is increased, and the solar energy is fully utilized, such that the power generation system has the advantages of high system efficiency, large work capacity, environmental friendliness, flexible operation mode, and low requirements for project site conditions.

(2) The power generation system provided by the present disclosure utilizes the hot water in the hot water tank as the inlet high temperature water for the saturator. The air is heated and humidified using the working characteristics of the saturator, which increases the temperature and mass flow of the working air and improves the system circulation efficiency and the work capacity, so as to realize high energy storage efficiency.

(3) The power generation system provided by the present disclosure utilizes the compression heat and solar energy resources and does not require fossil fuels, and has the advantages of being clean and pollution-free and environmentally friendly.

(4) The power generation system provided by the present disclosure makes full use of solar energy to heat the turbine inlet air, which increases the work capacity by the working fluid, and improves the power generation capacity of the system. In addition, the liquefaction of humid air causes certain damage to the blades, and the system heats the humid air using the solar energy to increase the temperature and prevent the liquefaction of water in the humid air from affecting the power generation system.

BRIEF DESCRIPTION OF THE DRAWINGS

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to obtain other drawings in accordance with these drawings without creative labor.

FIG. 1 is a schematic structural diagram illustrating an exemplary power generation system based on compressed air energy storage technology through solar auxiliary hot humid air.

Reference signs: 1—motor, 2—first compressor, 3—first compressor heat exchanger, 4—second compressor, 5—second compressor, 6—cold water tank, 7—air storage tank, 8—saturator, 9—solar heat collector, 10—solar heat exchanger, 11—saturator heat exchanger, 12—first turbine, 13—turbine heat exchanger, 14—second turbine, 15—hot water tank, 16—generator.

DETAILED DESCRIPTION

In order to more clearly illustrate the technical solutions of the embodiments of the present disclosure, the accompanying drawings required to be used in the description of the embodiments are briefly described below.

In the description of this application, it should be noted that the orientations or positional relationships indicated by the terms "center," "longitudinal," "transverse," "upper," "lower," "front," "back," "left," "right," "vertical," "horizontal," "top," "bottom," "inside," and "outside" are the orientations or position relationships shown in the drawings and only for the convenience of describing the present disclosure and simplifying the description, and do not indicate or imply that the device or element must have a specific orientation, be constructed and operated in a specific orientation. Therefore, it should not be understood as limitations of the present disclosure.

In addition, the terms "first" and "second" are used only for descriptive purposes and should not be understood as indicating or implying relative importance or implicitly indicating the number of technical features indicated. Thus, the features defined as "first" or "second" can explicitly or implicitly include one or more of the features. In this application, "a plurality" means two or more, unless otherwise specified.

In this application, unless otherwise expressly specified or limited, the terms "mounted", "connected", "connection," "communication", or the like, should be understood in a broad sense, for example, it can be a mechanical connection or an electrical connection, it can be a direct connection or it can be connected through an intermediate medium, it can be an indirect connection between two components or an interaction between two components. For those having ordinary skills in the art, the specific meanings of the above terms in this application can be understood according to specific circumstances.

Embodiment 1

Referring to FIG. 1, in some embodiments, the present disclosure provides a power generation system based on compressed air energy storage technology through solar auxiliary hot humid air. The power generation system comprises an energy storage subsystem, a solar heat storage subsystem, and a turbine generator subsystem which are connected in sequence, The energy storage subsystem includes a motor 1, a compressor and an air storage tank 7 which are connected in sequence. The energy storage subsystem further includes corresponding valves and pipelines. The solar heat storage subsystem includes a solar heat collector 9 and a solar heat exchanger 10. The heat exchanger 9 and the solar heat exchanger 10 are connected through a heat transfer oil circulation loop.

The energy storage subsystem further includes a water heat storage subsystem. The water heat storage subsystem includes a cold water tank 6 and a hot water tank 15 and corresponding valves and pipelines. A water circulation loop is formed between the cold water tank 6 and the hot water tank 15 through a saturator 8 and a plurality of heat exchangers. The plurality of heat exchangers include a compression heat exchanger connected with an outlet of the compressor, a turbine heat exchanger 13 connected with the turbine generator subsystem, and a saturator heat exchanger 11 connected with an air outlet of the saturator 8. The heat exchangers are air-water heat exchangers. An air inlet of the saturator 8 is connected with an outlet of the air storage tank, and an air outlet of the saturator heat exchanger 11 is connected with an air inlet of the solar heat exchanger 10.

It should be noted that the saturator 8 is a key component of the power generation system. Compressed air inside the saturator 8 is in countercurrent contact with hot water inside the saturator 8. High temperature water flows downward from a top of the saturator 8 through a packing layer and is in countercurrent contact with the compressed air entering from a bottom. During a humidification process, heat transfer and mass transfer occur simultaneously, achieving heating and humidification of the compressed air. An outlet of hot water tank 15 is connected with a water inlet of the saturator 8 through a pipeline, and a water outlet of the saturator 8 is connected with the cold water tank 6, so as to humidify and heat the air using hot water inside the hot water tank 15 before the air enters the turbine, which increases the mass flow of the air entering the turbine and improves the system efficiency and the work capacity.

In a preferred embodiment, an outlet of the solar heat collector 9 is connected with a heat transfer oil inlet of the solar heat exchanger 10, and a heat transfer oil outlet of the solar heat exchanger 10 is connected with an inlet of the solar heat collector. The solar heat collector 9 further heats the humid air at the outlet of the saturator 8, which helps to improve the work capacity of the humid air, avoids water erosion on the last stage blades, and improves the work capacity of the power generation system, thereby ensuring the safe operation of the power generation system.

In a preferred embodiment, an outlet of the hot water tank 15 is divided into three branches. Two of the three branches are connected with a water inlet of the saturator heat exchanger 11 and a water inlet of the turbine heat exchanger 13, respectively, and the other of the three branches is connected with a water inlet of the saturator 8. A water outlet of the saturator heat exchanger 11, a water outlet of the turbine heat exchanger 13, and a water outlet of the saturator 8 are jointed to be connected with an inlet of the cold water tank 6.

In a preferred embodiment, the energy storage subsystem includes a first compressor 2 and a second compressor 4. The compression heat exchanger includes a first compression heat exchanger 3 and a second compression heat exchanger 5. The first compressor 2, the first compression heat exchanger 3, the second compressor 4, and the second compression heat exchanger 5 are connected in sequence. An interstage heat exchanger, e.g., the first compression heat exchanger 3, is disposed between the first compressor 2 and the second compressor 4. An air outlet of the second compression heat exchanger 4 is connected with a post-stage heat exchanger, e.g., the second compression heat exchanger

6

5. An air outlet of the second compression heat exchanger 5 is connected with an inlet of the air storage tank 7.

In a preferred embodiment, the turbine generator subsystem includes a first turbine 12, a second turbine 14, and a generator 16. The first turbine 12, the turbine heat exchanger 13, the second turbine 14, and the generator 16 are connected in sequence. The first turbine 12 is connected with an air outlet of the solar heat exchanger 10, and an air outlet of the first turbine 12 and an air outlet of the second turbine 14 are connected to atmosphere.

In a preferred embodiment, the motor 1 is connected with the first compressor 2 through a compression transmission shaft.

In a preferred embodiment, the second turbine 14 is connected with the generator 16 through a turbine transmission shaft.

In a preferred embodiment, the outlet of the air storage tank 7 is provided with a throttling pressure reducing valve.

Operation modes of the power generation system based on the compressed air energy storage technology through solar auxiliary hot humid air include an energy storage mode and an energy release mode. When an electrical load is within a low valley, the power generation system in this embodiment turns on the energy storage mode. The power generation system drives the motor 1 using the electricity of the power grid, and the motor 1 drives the compressor to compress the air to a high pressure state. Meanwhile, the high pressure air is heat exchanged through the heat exchangers and stored in an air storage chamber. When the electrical load is within a peak, the power generation system of this embodiment turns on the energy release mode, and the air storage chamber releases the high pressure air. The high pressure air is first heated and humidified by the saturator 8, and then heated through the air-water heat exchanger and the solar heat exchanger 10 and enters the turbine to do work. Meanwhile, an interstage heat exchanger is disposed between two turbines to improve the quality of the humid air, thereby increasing the work capacity of the power generation system.

The present disclosure relates to a large-scale adiabatic compressed air energy storage power station, which has the characteristics of large energy storage capacity and high power of power generation. Both the energy storage power and the power of power generation can reach 100 MW level, which can meet the requirements of energy storage needs of UHVDC transmission. In a specific application scenario, a large underground salt cavern is used as an air storage tank. A volume of the air storage tank is 310000 $m^3$, a surface area of the air storage tank is 5000 $m^2$, a maximum storage pressure of the air storage tank is 7200 kPa, and a minimum discharge pressure of the air storage tank is 4200 kPa. In addition, the power generation system uses an air turbine, and under design conditions, an exhaust flow rate is 417 kg/s, and a system efficiency is 82%. The design operating parameters of the power generation system are as follows. Parameters of the compressor are found in Table 1.

TABLE 1

| Parameter | Numerical value |
|---|---|
| Compressor pressure ratio | 8 |
| Compressor exhaust flow rate (kg/s) | 108 |
| Compressor efficiency (%) | 88 |
| Compressor speed (rpm) | 5094 |

Other design parameters such as an ambient temperature, and an ambient pressure, and other design conditions of the solar heat collector, the saturator, and the heat exchangers are found in Table 2. The design conditions and calculation data of the energy storage process are found in Table 3. The design conditions and calculation data of the energy release process are found in Table 4.

TABLE 2

| Parameter | Unit | Numerical value |
|---|---|---|
| Ambient temperature | K | 293 |
| Environmental pressure | kPa | 101.3 |
| Initial air humidity | kg/kg | 0 |
| Initial cave pressure | kPa | 4700 |
| Heat transfer coefficient of air storage tank | W/(m$^2$K) | 30 |
| System filling time | h | 8 |
| System release time | h | 2 |
| Saturator mass transfer coefficient | kg/(m$^2$ · s) | 24 |
| Saturator material specific surface area | m$^2$/m$^3$ | 250 |
| Solar heat collector length | m | 12 |
| Solar heat collector opening width | m | 5.77 |
| Heat transfer oil density | kg/m$^3$ | 750 |
| Heat transfer oil specific heat capacity | J/(kg · K) | 2100 |
| Heat exchanger pressure loss | % | 2 |
| Heat exchanger efficiency | % | 95 |
| Saturator pressure loss | % | 2 |
| Longitude | ° | 126.63 |
| Latitude | ° | 45.75 |
| Sky projection coefficient | / | 0.7 |
| Number of days n | / | 60 |

TABLE 3

| Name | Unit | Numerical value |
|---|---|---|
| Atmospheric temperature | K | 293 |
| Initial temperature of heat transfer oil | K | 293 |
| Atmospheric pressure | kPa | 101.3 |
| First compressor inlet air pressure | kPa | 101.3 |
| First compressor outlet air pressure | kPa | 401.2 |
| First compressor outlet air temperature | K | 535.92 |
| Second compressor inlet air pressure | kPa | 393.2 |
| Second compressor inlet air temperature | K | 310.4 |
| Second compressor outlet air pressure | kPa | 1557 |
| Second compressor outlet air temperature | K | 499.19 |
| Air storage tank inlet temperature | K | 302.1 |
| Air storage tank inlet pressure | kPa | 5923 |
| Air storage tank final pressure | kPa | 5907 |
| Air storage tank final temperature | K | 298.8 |
| Hot water tank temperature | K | 562.4 |

TABLE 4

| Name | Unit | Numerical value |
|---|---|---|
| Saturator outlet air temperature | K | 422 |
| Saturator outlet air pressure | kPa | 3953 |
| First turbine inlet air temperature | K | 551.4 |
| First turbine inlet air pressure | kPa | 3874 |
| First turbine outlet air temperature | K | 383.2 |
| First turbine outlet air pressure | kPa | 694.1 |

TABLE 4-continued

| Name | Unit | Numerical value |
|---|---|---|
| Second turbine inlet air temperature | K | 501.9 |
| Second turbine inlet air pressure | kPa | 666.6 |
| Second turbine outlet air temperature | K | 349.2 |
| Second turbine outlet air pressure | kPa | 101.3 |

Embodiment 2

Some embodiments of the present disclosure provide a power generation method based on compressed air energy storage technology through solar auxiliary hot humid air, comprising:

in response that an electrical load is within a low valley, driving the motor 1 using grid electric energy. The motor 1 drives the compressor to compress air to a high pressure state, and the air is stored in the air storage tank 7 after being heat exchanged through the compression heat exchanger;

in response that the electrical load is within a peak, releasing high pressure air using the air storage tank 7. The high pressure air is heated and humidified by the saturator 8, then heated by the saturator heat exchanger 11 and the solar heat exchanger 10, and finally enters into the turbine generator subsystem to work for power generation.

According to the power generation system and method based on the compressed air energy storage technology through solar auxiliary hot humid air provided in the embodiments of the present disclosure, the power generation system compresses and stores compressed air using the electricity of the power grid when the electrical load is within the low valley, releases the compressed air when the electrical load is within the peak, and heats and humidifies the air before the air enters into the turbine using the recovered compression heat and solar energy to drive the turbine generator subsystem to work for power generation. The compression heat of the system is fully absorbed, the mass flow of the working fluid is increased, and the solar energy is fully utilized, such that the power generation system and the method have the advantages of high system efficiency, large work capacity, environmental friendliness, flexible operation mode, and low requirements for project site conditions. The power generation system utilizes the hot water in the hot water tank as the inlet high temperature water for the saturator. The air is heated and humidified using the working characteristics of the saturator, which increases the temperature and mass flow of the working air and improves the system circulation efficiency and the work capacity, so as to realize high energy storage efficiency. The power generation system utilizes the compression heat and solar energy resources and does not require fossil fuels, and has the advantages of being clean and pollution-free and environmentally friendly. The power generation system makes full use of solar energy to heat the turbine inlet air, which increases the work capacity by the working fluid, and improves the power generation capacity of the power generation system. In addition, the liquefaction of humid air causes certain damage to the blades, and the power generation system heats the humid air using the solar energy to increase the temperature and prevent the liquefaction of water in the humid air from affecting the power generation system.

Although the preferred embodiments of the present disclosure have been described, those skilled in the art may make additional variations and modifications to these embodiments once they are aware of the basic inventive concept. Therefore, the appended claims are intended to be interpreted as including the preferred embodiments and all variations and modifications that fall within the scope of the present disclosure. Obviously, those skilled in the art may make various variations and modifications to the present disclosure without departing from the spirit and scope of the present disclosure. Thus, these variations and modifications of the present disclosure that fall within the scope of the claims of the present disclosure and their equivalents are also included in the present disclosure.

What is claimed is:

1. A power generation system based on compressed air energy storage technology through solar auxiliary hot humid air, comprising:

an energy storage subsystem, a solar heat storage subsystem, and a turbine generator subsystem which are connected in sequence; wherein the energy storage subsystem includes a motor, a compressor, and an air storage tank which are connected in sequence;

the solar heat storage subsystem includes a solar heat collector and a solar heat exchanger, the solar heat collector and the solar heat exchanger being connected through a heat transfer oil circulation loop;

the power generation system further comprises a water heat storage subsystem, wherein the water heat storage subsystem includes a cold water tank and a hot water tank, a water circulation loop is formed between the cold water tank and the hot water tank through a saturator and a plurality of heat exchangers, the plurality of heat exchangers include a compression heat exchanger connected with an outlet of the compressor, a turbine heat exchanger connected with the turbine generator subsystem, and a saturator heat exchanger connected with an air outlet of the saturator; an air inlet of the saturator is connected with an outlet of the air storage tank, and an air outlet of the saturator heat exchanger is connected with an air inlet of the solar heat exchanger;

an outlet of the hot water tank is divided into three branches, two of the three branches are connected with a water inlet of the saturator heat exchanger and a water inlet of the turbine heat exchanger, respectively, the other of the three branches is connected with a water inlet of the saturator, wherein a water outlet of the saturator heat exchanger, a water outlet of the turbine heat exchanger, and a water outlet of the saturator are jointed to be connected with an inlet of the cold water tank;

an air temperature at the air outlet of the saturator is 422 K, and an air pressure at the air outlet of the saturator is 3953 kPa;

a pressure ratio of the compressor is 8, an exhaust flow rate of the compressor is 108 kg/s, an efficiency of the compressor is 88%, and a rotation speed of the compressor is 5094 rpm;

a volume of the air storage tank is 310000 $m^3$, a surface area of the air storage tank is 5000 $m^2$, a maximum storage pressure of the air storage tank is 7200 kPa, and a minimum discharge pressure of the air storage tank is 4200 kPa.

2. The power generation system of claim 1, wherein an outlet of the solar heat collector is connected with a heat transfer oil inlet of the solar heat exchanger, and a heat transfer oil outlet of the solar heat exchanger is connected with an inlet of the solar heat collector.

3. The power generation system of claim 1, wherein the energy storage subsystem includes a first compressor and a second compressor, the compression heat exchanger includes a first compression heat exchanger and a second compression heat exchanger, the first compressor, the first compression heat exchanger, the second compressor, and the second compression heat exchanger are connected in sequence, and an air outlet of the second compression heat exchanger is connected with an inlet of the air storage tank.

4. The power generation system of claim 1, wherein the turbine generator subsystem includes a first turbine, a second turbine, and a generator, the first turbine, the turbine heat exchanger, the second turbine, and the generator are connected in sequence, the first turbine is connected with an air outlet of the solar heat exchanger, and an air outlet of the first turbine and an air outlet of the second turbine are connected to atmosphere.

5. The power generation system of claim 3, wherein the motor is connected with the first compressor through a compression transmission shaft.

6. The power generation system of claim 4, wherein the second turbine is connected with the generator through a turbine transmission shaft.

7. A power generation method based on compressed air energy storage technology through solar auxiliary hot humid air, implemented by a power generation system, wherein the power generation system comprises:

an energy storage subsystem, a solar heat storage subsystem, and a turbine generator subsystem which are connected in sequence; wherein the energy storage subsystem includes a motor, a compressor, and an air storage tank which are connected in sequence;

the solar heat storage subsystem includes a solar heat collector and a solar heat exchanger, the solar heat collector and the solar heat exchanger being connected through a heat transfer oil circulation loop;

the power generation system further comprises a water heat storage subsystem, wherein the water heat storage subsystem includes a cold water tank and a hot water tank, a water circulation loop is formed between the cold water tank and the hot water tank through a saturator and a plurality of heat exchangers, the plurality of heat exchangers include a compression heat exchanger connected with an outlet of the compressor, a turbine heat exchanger connected with the turbine generator subsystem, and a saturator heat exchanger connected with an air outlet of the saturator; an air inlet of the saturator is connected with an outlet of the air storage tank, and an air outlet of the saturator heat exchanger is connected with an air inlet of the solar heat exchanger;

an outlet of the hot water tank is divided into three branches, two of the three branches are connected with a water inlet of the saturator heat exchanger and a water inlet of the turbine heat exchanger, respectively, the other of the three branches is connected with a water inlet of the saturator, wherein a water outlet of the saturator heat exchanger, a water outlet of the turbine heat exchanger, and a water outlet of the saturator are jointed to be connected with an inlet of the cold water tank;

an air temperature at the air outlet of the saturator is 422 K, and an air pressure at the air outlet of the saturator is 3953 kPa;

a pressure ratio of the compressor is 8, an exhaust flow rate of the compressor is 108 kg/s, an efficiency of the compressor is 88%, and a rotation speed of the compressor is 5094 rpm;

a volume of the air storage tank is 310000 m3, a surface area of the air storage tank is 5000m2, a maximum storage pressure of the air storage tank is 7200 kPa, and a minimum discharge pressure of the air storage tank is 4200 kPa, the power generation method comprising:

in response that an electrical load is within a low valley, driving the motor using grid electric energy, wherein the motor drives the compressor to compress air to a high pressure state, and the air is stored in the air storage tank after being heat exchanged through the compression heat exchanger; and in response that the electrical load is within a peak, releasing high pressure air using the air storage tank, wherein the high pressure air is heated and humidified by the saturator, then heated by the saturator heat exchanger and the solar heat exchanger, and finally enters into the turbine generator subsystem to work for power generation.

* * * * *